US010823158B2

(12) United States Patent
Walker, II et al.

(10) Patent No.: US 10,823,158 B2
(45) Date of Patent: Nov. 3, 2020

(54) DEPLOYABLE GRIDDED ION THRUSTER

(71) Applicant: GEORGIA TECH RESEARCH CORPORATION, Atlanta, GA (US)

(72) Inventors: Mitchell L. R. Walker, II, Atlanta, GA (US); Cheong Chan, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 47 days.

(21) Appl. No.: 16/322,801

(22) PCT Filed: Aug. 1, 2017

(86) PCT No.: PCT/US2017/044847
§ 371 (c)(1),
(2) Date: Feb. 1, 2019

(87) PCT Pub. No.: WO2018/026786
PCT Pub. Date: Feb. 8, 2018

(65) Prior Publication Data
US 2019/0195206 A1    Jun. 27, 2019

Related U.S. Application Data

(60) Provisional application No. 62/369,315, filed on Aug. 1, 2016.

(51) Int. Cl.
*F03H 1/00*    (2006.01)
*B64G 1/40*    (2006.01)

(52) U.S. Cl.
CPC ............. *F03H 1/0043* (2013.01); *B64G 1/40* (2013.01); *B64G 1/405* (2013.01)

(58) Field of Classification Search
CPC ..................... F03H 1/00–0093; B64G 1/405
See application file for complete search history.

(56) References Cited

U.S. PATENT DOCUMENTS

| 3,102,384 | A |   | 3/1963  | Bennett |
|-----------|---|---|---------|---------|
| 3,262,262 | A |   | 7/1966  | Reader et al. |
| 3,345,820 | A | * | 10/1967 | Dryden ............... H01J 27/14 60/202 |

(Continued)

OTHER PUBLICATIONS

International Search report dated Oct. 12, 2017.

(Continued)

*Primary Examiner* — Scott J Walthour
*Assistant Examiner* — William L Breazeal
(74) *Attorney, Agent, or Firm* — Thomas Horstemeyer, LLP

(57) ABSTRACT

Various examples related to a deployable gridded ion thruster are described. A deployable gridded ion thruster can include: a thruster body including an ion generating unit; and an expandable discharge chamber configured to expand from a stored configuration to a deployed configuration. The expandable discharge chamber can include a chamber wall having a first geometric shape compressed within the thruster body when in the stored configuration and a second geometric shape expanded outward from the thruster body when in the deployed configuration. Also described herein are methods of operation for a deployable gridded ion thruster.

18 Claims, 5 Drawing Sheets

(56) References Cited

U.S. PATENT DOCUMENTS

| | | | | |
|---|---|---|---|---|
| 3,371,489 | A | * 3/1968 | Eckhardt | H01J 1/13 |
| | | | | 60/202 |
| 3,412,559 | A | * 11/1968 | Sohl | H01J 27/14 |
| | | | | 60/202 |
| 4,707,899 | A | 11/1987 | Singer | |
| 2002/0194833 | A1 | 12/2002 | Gallimore et al. | |
| 2012/0019143 | A1 | 1/2012 | Kadrnoschka et al. | |

OTHER PUBLICATIONS

Manan Arya, Nicolas Lee, and Sergio Pellegrino."Ultralight Structures for Space Solar Power Satellites",3rd AIAA Spacecraft Structures Conference,AIAA SciTech Forum (Jan. 2016).

Deployable Gridded Ion Thruster, Technology #7241, Mitchell Walker and Cheong Chan (Jun. 2016) http://technologies.gtrc.gatech.edu/technologies/7241_deployable-gridded-ion-thruster.

* cited by examiner

DEPLOYABLE GRIDDED ION THRUSTER

CROSS-REFERENCE TO RELATED APPLICATION

This application is the 35 U.S.C. § 371 national stage application of PCT Application No. PCT/US2017/044847, filed Aug. 1, 2017, which claims priority to, and the benefit of, U.S. provisional application entitled "Deployable Gridded Ion Thruster" having Ser. No. 62/369,315, filed Aug. 1, 2016, both of which are hereby incorporated by reference in their entireties.

BACKGROUND

The recent growth of small satellite development efforts presents an opportunity to operationalize space as a tactical resource via fractionalized, rapidly-deployable space assets. While advances in microelectronics and micro-electromechanical systems for spacecraft subsystems are increasingly more sophisticated, miniaturized, and robust, high-performance technologies for responsive propulsion onboard small satellites remain elusive.

SUMMARY

The present disclosure is related to deployable gridded ion thrusters.

One aspect of the disclosure, among others, encompasses a deployable gridded ion thruster, comprising a thruster body including an ion generating unit; and an expandable discharge chamber configured to expand from a stored configuration to a deployed configuration, where the expandable discharge chamber comprises a chamber wall having a first geometric shape compressed within the thruster body when in the stored configuration and a second geometric shape expanded outward from the thruster body when in the deployed configuration. In various aspects, the expandable discharge chamber of deployable gridded ion thruster can be further configured to retract from the second geometric shape to the first geometric shape. The expandable discharge chamber can be deployed by burning a wire. The expandable discharge chamber can be deployed by releasing a latch. In various aspects, the second geometric shape in the deployed configuration can have a large volume to surface area ratio inside the expandable discharge chamber. The expandable discharge chamber can be compressed from the second geometric shape to the first geometric shape while in orbit. The chamber wall of the expandable discharge chamber can be shaped as an origami tube, where the origami tube is folded to a flattened state in the first geometric shape and unfolds to the second geometric shape with deformations occurring only at fold lines. A magnetic field can be generated by electrical circuits printed on a circumference of the discharge chamber. In various aspects, the deployable gridded ion thruster can be sized to fit within a cube with dimensions of 10 cm×10 cm×10 cm when the expandable discharge chamber is in the stored configuration.

Another aspect of the disclosure, among others, encompasses a method of deploying a deployable gridded ion thruster, comprising: launching the deployable gridded ion thruster into orbit, wherein the deployable gridded ion thruster comprises an expandable discharge chamber having a chamber wall configured to expand from a first geometric shape compressed in a stored configuration in a thruster body to a second geometric shape expanded in a deployed configuration extending from the thruster body; and deploying the expandable discharge chamber. In various aspects, deploying the expandable discharge chamber can comprise expanding the expandable discharge chamber from the first geometric shape to the second geometric shape. The method can further comprise releasing the expandable discharge chamber from the storage configuration by burning a wire or by releasing a latch. In various aspects, the second geometric shape in the deployed configuration can have a large volume to surface area ratio inside the expandable discharge chamber. The method can further comprise compressing the expandable discharge chamber from the second geometric shape to the first geometric shape while in orbit. The chamber wall of the expandable discharge chamber can be shaped as an origami tube, wherein the origami tube is folded to a flattened state in the first geometric shape and unfolds to the second geometric shape with deformations occurring only at fold lines. In various aspects, a magnetic field can be generated by electrical circuits printed on a circumference of the expandable discharge chamber. The deployable gridded ion thruster can be sized to fit within a cube with dimensions of 10 cm×10 cm×10 cm when the expandable discharge chamber is in the stored configuration.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Further aspects of the present disclosure will be readily appreciated upon review of the detailed description of its various embodiments, described below, when taken in conjunction with the accompanying drawings.

DETAILED DESCRIPTION

Figure 1:
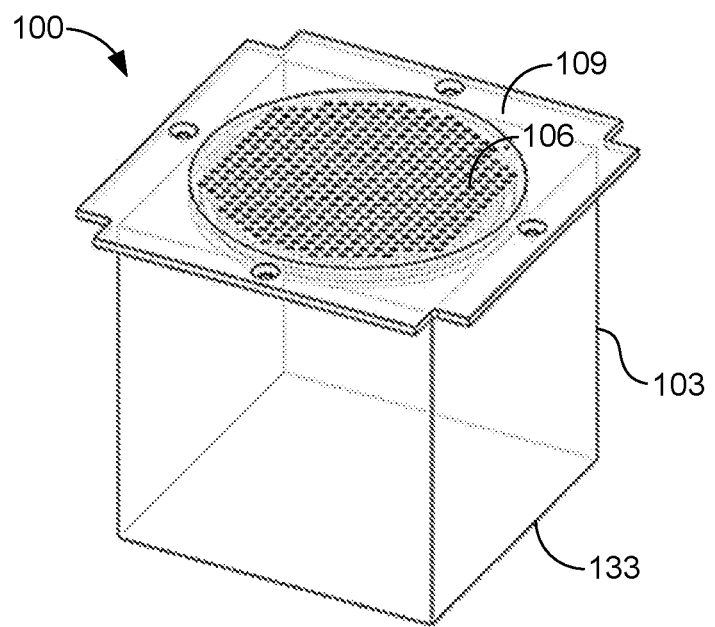
FIG. 1 is an isometric view of an example of a deployable gridded ion thruster in a storage configuration, according to various embodiments of the present disclosure.

Disclosed herein are various examples of methods, systems, apparatus and devices related to a deployable gridded ion thruster. Reference will now be made in detail to the description of the embodiments as illustrated in the drawings, wherein like reference numbers indicate like parts throughout the several views.

There are a variety of propulsion systems that can be considered for spacecraft. However, the size and type are based on the specific environment and use of the spacecraft. For example, the thrust required to escape gravity and deliver a spacecraft to orbit is much greater than the thrust needed to position a spacecraft once in orbit. Accordingly, the size of the propulsion system can correspond to the amount of thrust required to deliver a spacecraft and its payload into orbit. However, once in orbit, the spacecraft is in a vacuum environment and not competing with the forces of gravity. It can be much more efficient to rely on a separate propulsion system for orbital positioning or movement. It is also possible to deliver one or more spacecraft with independent propulsion systems within the payload of a launch vehicle that is launched into orbit. These spacecraft can utilize smaller propulsion systems. As such, the mass, structural integrity, and stability of the fuel source also need to be considered in determining an effective solution for propulsion needs.

While chemical propulsion systems have been traditionally used for delivery into orbit, they may not be necessary for the thrust requirements in space. To support satellite missions necessitating large propulsive impulses, miniaturized electric propulsion (EP) systems with a higher achievable specific impulse $i_{sp}$ (e.g., 150-4000 s) can be considered. Gridded ion thrusters (GITs) and Hall effect thrusters (HETs) have governing physics and performance characteristics that are well understood due to the EP community's extensive experience with full-sized, flight-proven thrusters. These EP technologies have power requirements (about 100 W) that can be met with deployable solar panels.

Conventional propulsion systems that use cold gas or chemical propellants face significant constraints when used onboard a small satellite, such as a CubeSat platform. These constraints severely limit their overall propulsive performance. If launched as a secondary payload, small satellites are generally not permitted to have pressurized propellant tanks to reduce risk to the primary spacecraft. Such low-pressure cold gas and chemical propulsion systems possess very low $I_{sp}$ (typically <300 s), that when coupled with the limited volume onboard for propellant storage, leads to a low achievable propulsive impulse.

The GIT has high $I_{sp}$ capability (i.e., about 1000-10000 s) that facilitate extended mission lifetimes. The thruster operates by having neutral propellant injected into a discharge chamber. The propellant is ionized by electrons confined by a multipole magnetic cusp topology, accelerated via electrostatic fields generated by the ion grid optics, and neutralized by an external cathode to prevent spacecraft charge buildup.

The HET has a lower $I_{sp}$ capability (about 1000-3000 s with xenon propellant) compared to gridded ion thrusters, but provides a greater thrust-to-power ratio capability that is desirable for rapid maneuverability and time-critical missions. The HET operates by having neutral propellant injected into an annular discharge channel via a gas distributor anode. The propellant is ionized by the Hall current formed by external cathode electrons subjected to crossed electric and magnetic fields, accelerated via the imposed electrostatic field, and neutralized by the external cathode to prevent spacecraft charge buildup.

Unfortunately, both GITs and HETs suffer significant losses in performance when miniaturized to the size required for packaging on volume-limited CubeSat platforms due to poor physical scaling of the ionization process. For example, 5-kW class GITs and HETs operate at an efficiency of 60-80%. Miniaturized versions of the same thrusters for CubeSat applications have efficiencies below 30%. Thus, miniaturized GITs and HETs are poor propulsion candidates for volume-limited of small satellite platforms.

While ion thrusters can be considered an efficient and effective form of propulsion in space, they cannot be used to launch a payload in the atmosphere of Earth and the propulsion system becomes part of the load which needs to be delivered to orbit. As such, ion thrusters still need to meet the structural requirements of launch which can increase both the size and mass of the thruster, competing with the orbital spacecraft for the limited payload volume and mass upon launch.

With the continuing miniaturization of satellite components, small nano- and pico-satellites are growing in importance. For example, the CubeSat standard facilitates an affordable access to space in a compact form, but is limited to a 10 cm$^3$ cube with a mass no greater than 1.33 kg. Ion thrusters are proven, reliable propulsion systems with high specific impulse, which makes them superior to chemical propulsion systems for long-duration station-keeping and large orbit transfers. However, existing ion propulsion systems with the needed performance are too large for the geometric architectures of small satellites. Sizing an ion thruster to fit within the limited volume of a small satellite by miniaturizing the components also limits the output of the thruster, reducing its effectiveness, and occupies much of the allocated storage volume for the satellite. The power and space limitations in small satellites presently constrain the use of ion thrusters, thereby necessitating the use of chemical propulsion systems.

A deployable ion gridded thruster overcomes the challenges of limited space and mass of a small satellite, allowing more storage volume for the satellite and maintaining the structural integrity required to withstand the vibration and forces applied during launch within a launch vehicle. A system and method to store a high-performance gridded ion thruster in a small volume compatible with the dimensions of a small spacecraft for efficient storage during launch to orbit has been developed. Once the spacecraft is ejected from the launch vehicle, the gridded ion thruster is deployed to its full operational geometry and physical size. The small storage volume of the deployable discharge chamber frees up volume for fuel and/or payload.

Because a traditional gridded ion thruster requires a large volume for the discharge chamber for the ionization, not only does it take up an already limited volume of a small satellite, but a traditional ion thruster would require additional reinforcement of the walls to withstand a launch, adding extra mass and extra structures to an engine that are unnecessary once in space. The deployable ion gridded thruster is structurally stable in a stored configuration to provide the needed rigidity and strength to withstand forces during launch without adding the mass and volume of additional structural components. Although the deployable gridded ion thruster is not limited to use in small satellites, the unique configuration and limitations of a small satellite can be met and thrust optimized with the deployable gridded ion thruster. Because deployable gridded ion thruster is collapsible into a compact storage volume or geometry for launch, it can be sized and optimized for any size spacecraft. Once in orbit, the discharge chamber of the deployable ion gridded thruster can be expanded to a deployed (or operational) configuration, providing a properly sized discharge chamber and a fully operational ion thruster with full capability. Since structure of the deployable gridded ion thruster does not include the reinforcing structures that are designed to survive nominal launch loads of traditional GITs, the operational thruster is lighter than traditional electric propulsion devices.

The deployable gridded ion thruster can provide high-performance propulsive capability onboard satellites by leveraging foldable, flexible printed circuits to provide the requisite magnetic fields and plasma discharge boundaries (origami-like), a high-technology readiness level (TRL) gridded ion thrusters. The deployable gridded ion thruster architecture enables impulse-demanding missions, facilitates the use of satellite swarm mission architectures for improved resiliency of space assets, and supports rapid-launch capability of mission-specific thruster designs.

Deploying a large ion thruster whose physical dimensions are larger than the dimensions of the launch configuration is important and advantageous for two reasons. First, the large size of the deployed gridded ion thruster creates a large internal volume-to-surface area ratio in the plasma discharge chamber of the gridded ion thruster, which enables efficient propulsion ionization and high propellant utilization. The combination of these parameters supports a high-efficiency gridded ion thruster. Second, the large size of the deployed gridded ion thruster creates the surface area that allows the thruster to passively cool itself through radiation to the space environment. The two advantages delivered through the use of a deployable gridded ion thruster enable a propulsion system capability, for sufficiently-powered satellites to perform large delta-V maneuvers that may include transfers to other bodies in space such as, e.g., the moon.

The deployable gridded ion thruster provides a high specific impulse thruster that can be stored in a limited volume to be deployed remotely. This provides a higher output to meet the needs of a payload, while being collapsible to be stored in a compact form in a small volume. This high-performance gridded ion thruster enables efficient ion thruster propulsion for small satellites, such as high specific-impulse station-keeping and orbit-transfer capabilities. The large surface area for the discharge chamber of the gridded ion thruster enables efficient propellant ionization and utilization and can be deployed from a small stowed internal volume, freeing up space for fuel and payload. For example, it can be compatible with the dimensions of a CubeSat spacecraft (on the order of 10 cm×10 cm×10 cm) for efficient storage during the launch to orbit. Once the satellite or spacecraft with the deployable GIT propulsion device is ejected from the launch vehicle, the gridded ion thruster can be deployed to its full operational geometry and physical size.

The chamber wall of the expandable discharge chamber of the deployable gridded ion thruster can be fabricated from a conductive or insulating material or combination thereof. The interior of the unfolded chamber wall of the expanded discharge chamber acts as an anode. The anode material must be conductive (typically metal) to complete the electrical circuit. This allows the supporting structure to be made of either an electrically insulating material or an electrically conducting material or a combination of the two materials. For example, the anode can be fabricated from stainless steel, steel, iron, molybdenum, copper, or the similar electrically conductive material. The support structure can include materials such as mica, macor, vacuum-rated plastics, G10, and the like.

The magnetic field required for containment of electrons within the discharge chamber can be provided by permanent magnets or solenoids. The permanent magnetic material can be printed on the wall of the expandable discharge chamber, or electrical circuits (that carry current) can be printed on the circumference of the discharge chamber to generate the needed magnetic field topology.

The expandable discharge chamber of the deployable gridded ion thruster can be compressed and stored within the limited payload volume for the launch of small satellites. The expandable discharge chamber enables an established propulsion system to be integrated into small satellites. The expandable discharge chamber can be configured to deploy from its storage volume (or stored configuration) to its operation volume (or deployed configuration) when it reaches space. In some embodiments, the structure of the expandable discharge chamber utilizes folded structures such as, e.g., origami tubes to provide the necessary surface area and volume. For example, the origami tube can be folded to a flattened state in the stored configuration and unfolded to the deployed configuration with deformations occurring only at fold lines. In some embodiments, the structure of the expandable discharge chamber can use elastic, lightweight, multifunctional tiles that are folded and wrapped using slipping folds. In some embodiments, the structure of the expandable discharge chamber may extend telescopically from the storage volume to operational volume. In some embodiments, the height of the deployed discharge chamber can be 10 times the height of the discharge chamber when its walls are collapsed in the stored configuration. The height of the discharge chamber can be optimized for the highest performance height without deforming the cylinder structure.

The discharge chamber of the deployable gridded ion thruster can be secured in its collapsed configuration for launch by one or more wires, one or more latches, or other device to maintain the compressed configuration. When folded in the stored configuration, the discharge chamber can have spring loaded properties that allow it to automatically expand once the securing device is released. Once in orbit, the discharge chamber can be deployed by elastic or mechanical means. For example, the securing device can be released to allow the compressed discharge chamber to spring to its operational geometry. This can be done by burning a wire, releasing the latch, or other form of remote actuation. Additionally, the deployable gridded ion thruster can deploy from its storage volume to its operational volume when it reaches space by use of a sensor or controlled in another manner, such as a computer program. Additionally, the deployable gridded ion thruster can be configured to collapse back to its storage volume while in space. The grid and chamber can also be retracted to storage configuration with a retraction mechanism. For example, the retraction mechanism can comprise a pulley with strings or wires attached to the grid, which can be actuated by an electric motor within the thruster body to pull the ion grids and discharge chamber into the storage configuration.

Referring now to FIG. 1, shown is a perspective view illustrating an example of a deployable gridded ion thruster 100 in a stored configuration, according to various embodiments of the present disclosure. The expandable discharge chamber is shown compressed to its storage state within the thruster body 103. The ion grids 106 of the deployable gridded ion thruster are shown flush with the top surface 109 of the thruster body 103. The thruster body 103 can contain the fuel and subsystems needed to produce thrust.

Figure 2:
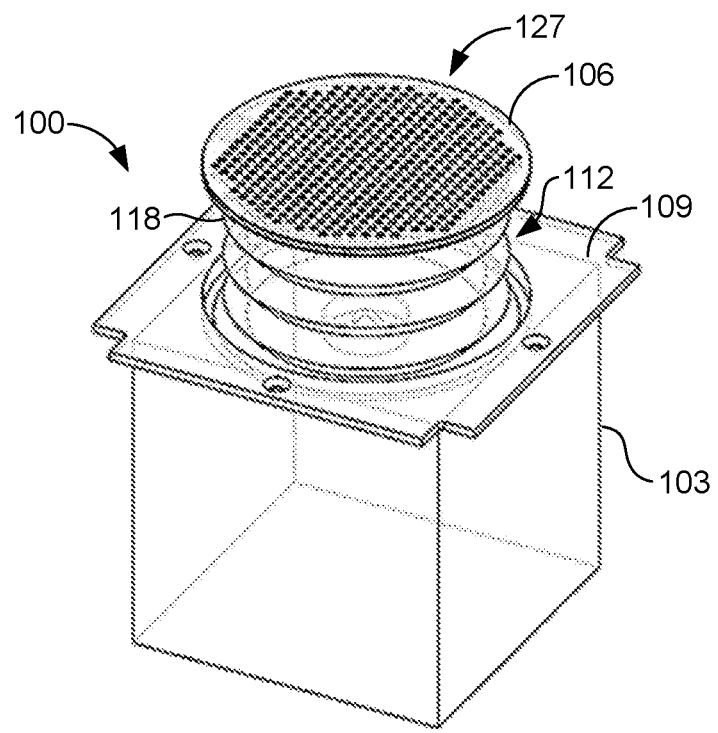
FIG. 2 is an isometric view of the deployable gridded ion thruster of FIG. 1 in a deployed configuration, according to various embodiments of the present disclosure.

Turning next to FIG. 2, shown in an example of the gridded ion thruster 100 with the discharge chamber 112 expanded to a deployed configuration, according to various embodiments of the present disclosure. The expandable discharge chamber 112 is shown deployed to its operational state external to the thruster body 103. The expanded discharge chamber 112 can be many times larger in volume than its stored configuration. The ion grids 106 of the gridded ion thruster are shown in operational position at the distal end of the discharge chamber. A discharge cathode 115 is illustrated within the thruster body at the proximal end of the discharge chamber. The position of the cathode 115 can move rearward (away from the grids) in the deployed configuration. The unfolded chamber wall 118 of the expanded discharge chamber 103 acts as an anode. The interior surface 121 of the chamber wall 118 can be conductive. The discharge chamber wall 118 can be made of a single material or multiple layers of a combination of conductive and insulating material. In various embodiments, there can be an exterior neutralizer cathode 124 positioned at the exterior of the chamber exit 127 at the ion grids to neutralize ions near the thruster. The exterior neutralizer cathode 124 can be positioned on the edge of the grid 106, so that when the grid is deployed, the neutralizer cathode 124 is also deployed. In other embodiments, the neutralizer cathode can be an annular ring attached to and surrounding the grid 106, but insulated from it.

Figure 3:
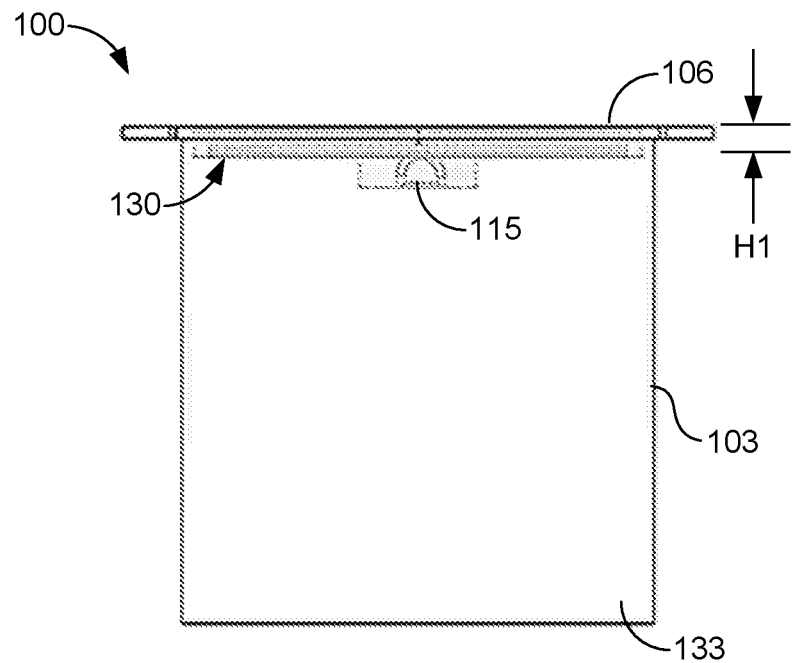
FIG. 3 is a cross-sectional view of the deployable gridded ion thruster in the storage configuration of FIG. 1, according to various embodiments of the present disclosure.

As shown in FIG. 3, the deployable a gridded ion thruster 100 in the stored configuration is illustrated in cross-section, according to various embodiments of the present disclosure. The expandable discharge chamber 112 is shown as an anode compressed to its storage volume (or state) within the thruster body. The ion grids 106 of the gridded ion thruster are shown flush with the top surface 109 of the thruster body 103, and can provide protection of the folded discharge chamber wall 118. The position of the discharge cathode 115 is shown beneath the folded anode chamber wall 118 within the thruster body 103.

The location of the cathode 115 in the thruster body may be varied. It can be deployed forward or backward from its initial stored location depending on the device requirements. When the chamber wall 118 collapses, it is effectively in a storage plane 130 with a storage thickness H1 flush with surface of the end plate 109 and extending into the thruster body 103. When deployed, the discharge chamber 112 extends outward from the top surface of the end plate 109, away from the thruster body 103, to an operational height H2. The cathode 115 can move inward toward the base 133 of the thruster body 103 to an operational location. The cathode 115 can be moved toward the thruster body base 133 before start as the discharge chamber is deployed.

Figure 4:
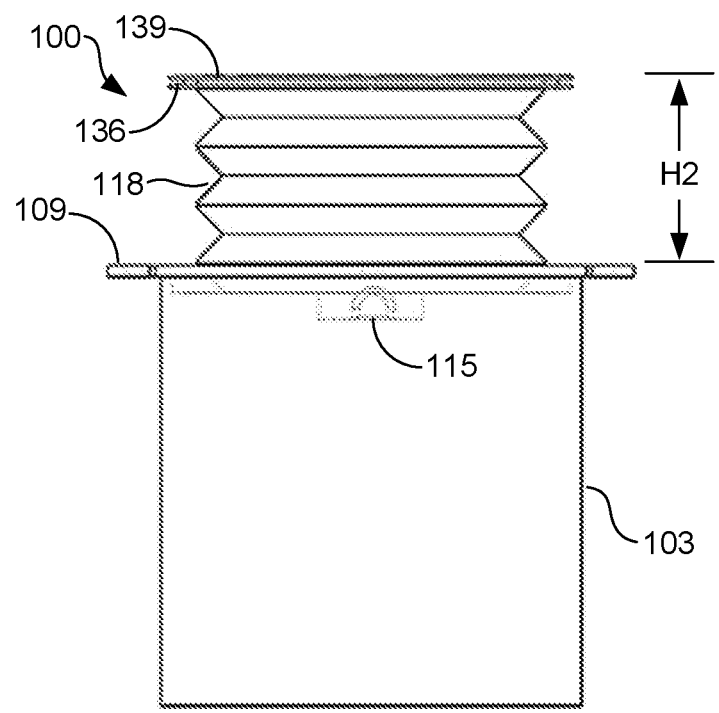
FIG. 4 is a side view of the deployable gridded ion thruster in the deployed configuration of FIG. 2, according to various embodiments of the present disclosure.

Turning next to FIG. 4, the deployable gridded ion thruster 100 is shown with the discharge chamber 112 expanded to the deployed configuration, according to various embodiments of the present disclosure. The expandable discharge chamber 112 is shown deployed to its operational state external to the thruster body 103. The expandable discharge chamber 112 can be many times larger than its storage configuration. The ion grids 106 of the gridded ion thruster are shown in operational position at the distal end of the discharge chamber. In some embodiments, there can be at least 2 or 3 ion grids. For example, a first ion grid 136 and a second ion grid 139 are shown. The discharge cathode 115 is shown within the thruster body 103 at the proximal end of the discharge chamber 112. The expanded discharge chamber 112 is shown as an anode.

Figure 5:
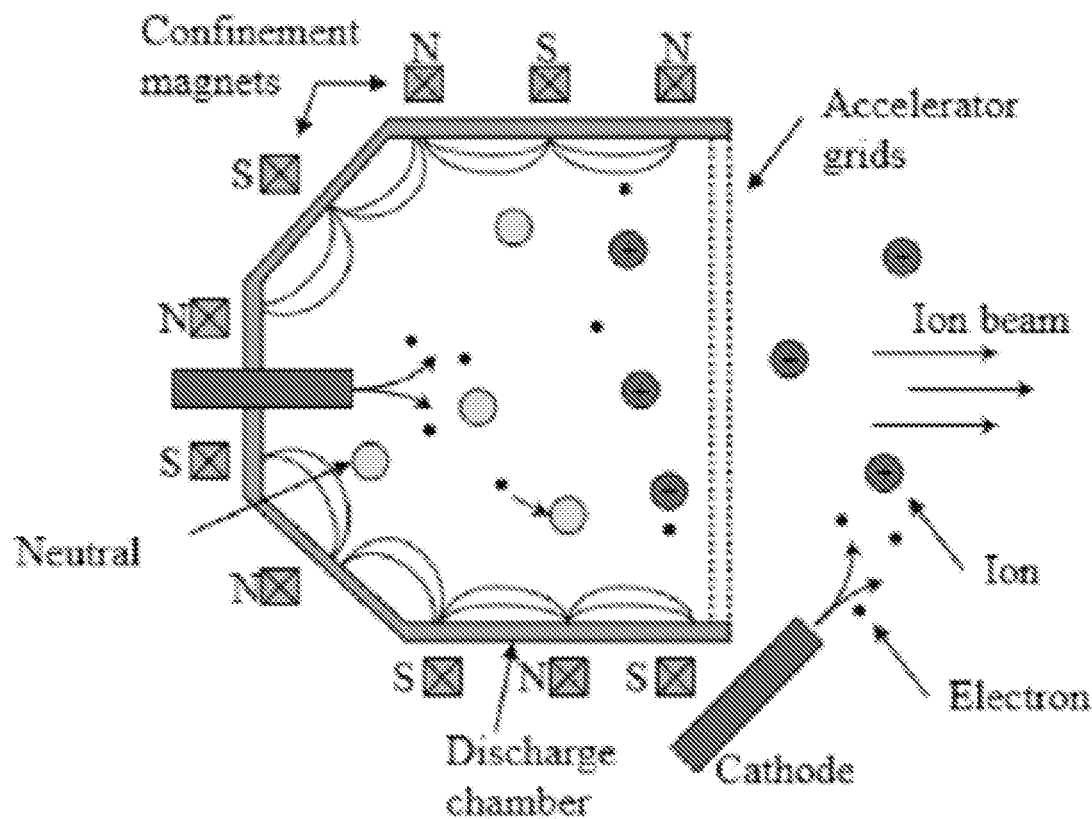
FIG. 5 is a schematic diagram illustrating an example of ion generation of a deployable gridded ion thruster, according to various embodiments of the present disclosure.

A standard configuration of a traditional gridded ion thruster is depicted in FIG. 5. As shown, the traditional components of a GIT include a cathode, confinement magnets operating at the chamber walls, and accelerator grids to produce an ion beam that is expelled through the ion grids. An additional neutralizer cathode is shown at the exit of the chamber to neutralize ions near the thruster engine. In the case of the deployable gridded ion thruster, electrical circuits (e.g., magnetic coils) can be printed on the inside of the discharge chamber wall. When energized, the circuits can produce the magnetic fields needed to generate and control the ion thrust of the unit. The neutralizer cathode may be a single unit or it may be distributed around the outer circumference of the grid set. The structure of the neutralizer cathode is electrically isolated from the grid set.

In some implementations, the magnetic fields for the discharge chamber 112 of the deployable gridded ion thruster 100 can be established using small permanent magnets or solenoids attached to the exterior surface of the discharge chamber 112 similar to a traditional GIT, similar to the magnet placements shown in FIG. 5. In other embodiments, the chamber wall 118 can comprise printed thereon that, when energized, can establish the magnetic fields. In some cases, the chamber wall 118 can comprise a metal interior surface 121. In various embodiments, the magnetic circuit can be printed on the interior surface 121 of the chamber wall 118. In an embodiment, an independent sleeve with a printed circuit can be deployed simultaneously with the chamber. The second deployment can fold out along the outside of the first sleeve which is the chamber wall.

Figure 6:
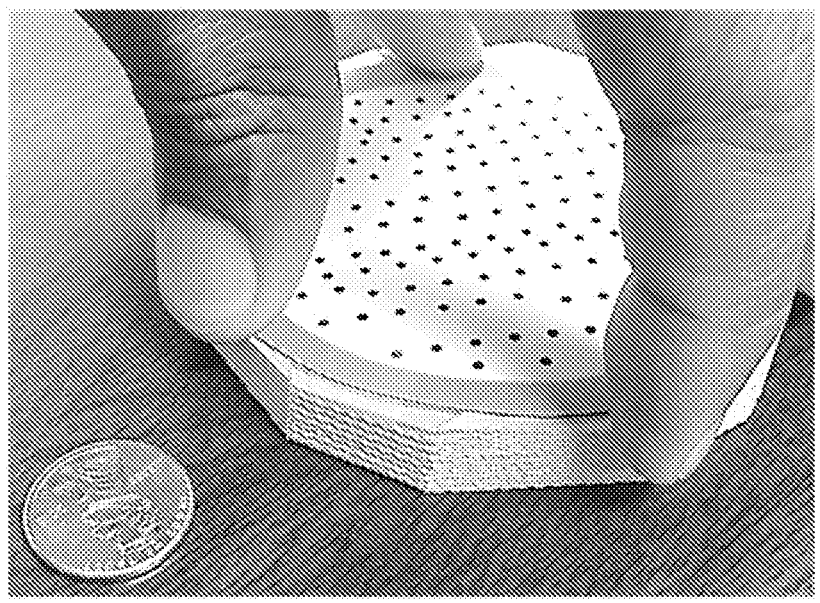
FIG. 6 is an image depicting an example of an expandable discharge chamber folded in a storage configuration, according to various embodiments of the present disclosure.
Figure 7:
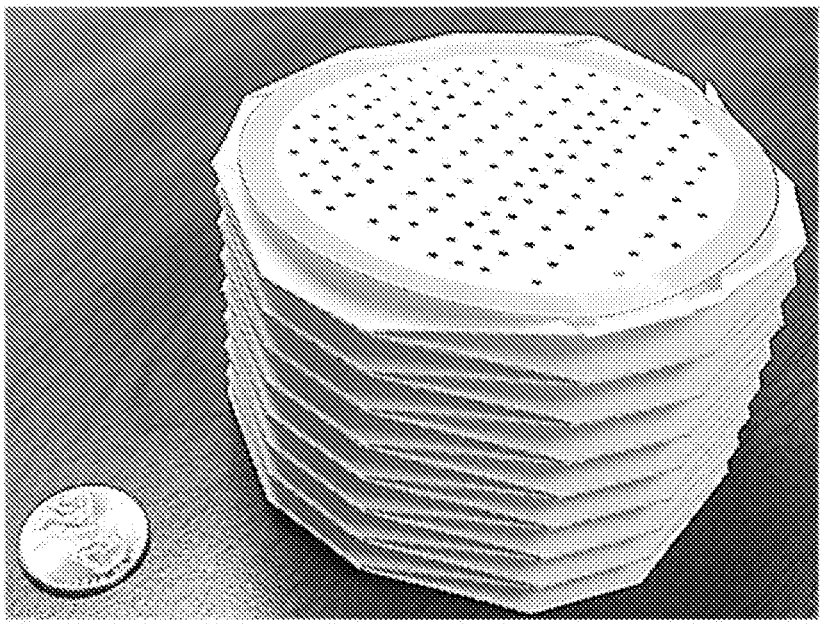
FIG. 7 is an image depicting an example of the expandable discharge chamber of FIG. 6 in a deployed configuration, according to various embodiments of the present disclosure.

Turning next to FIGS. 6 and 7, shown are images of an example of an expandable discharge chamber 112. FIG. 6 shows the folded discharge chamber 112 collapsed into a stored configuration. As can be seen, the wall of the discharge chamber folds flat to a storage volume suitable for inclusion in the thruster body. Origami folding techniques can be used to achieve a very small storage volume. In FIG. 7 the discharge chamber is shown expanded into a deployed configuration. The origami folds can provide a spring action that extends the discharge chamber outward when released. In some implementations, springs or other mechanisms can be included to aid in the full deployment of the discharge chamber. The deployable gridded ion thruster can also include retracting mechanisms that allow the discharge chamber to be collapsed back to its stored configuration. For example, a pulley with strings or wires attached to the grid could be actuated by an electric motor within the thruster body to pull the ion grids and discharge chamber into the storage configuration.

The performance of the deployable gridded ion thruster 110 can be improved as the discharge chamber 112 approaches a cylindrical shape. The cross-sectional shape of the discharge chamber 112 can be a polygonal shape. As the number of sides increases, the polygonal shape approaches a circular shape, thus near cylindrical when deployed to provide the best volume to surface area ratio. The expandable discharge chamber of the deployable gridded ion thruster can be deployed as a cylinder, thus minimizing the surface and maximizing the volume. However, a cylinder is not required, to obtain the desired flatness. A multi-faceted origami tube can be used to approximate a cylinder. The greater the number of sides to approximate a cylinder, the higher the performance of the thruster.

The chamber wall can be fabricated using a thin metal, such as a metallic foil, which can be folded and unfolded to expand to the operational volume. The interior surface of the discharge chamber can be a metal or combination of metals. The interior surface can be a metal or conducting material to form an anode, such as stainless steel, steel, iron, molybdenum, copper, and the like. An insulator can be used as a layer or additional sleeve for the discharge chamber. The insulator can be mica, macor, vacuum-rated plastics, G10, or other durable insulating material that can withstand the temperature variations of launch and space. In various embodiments, the chamber wall can be metal with an insulator coated on the outside surface. In some embodiments, thicker multi-faceted faces can be attached to a thinner material, either metallic or non-metallic, to provide more efficiency in folding. For example, a thin material can be plated with metal facets such that when in a storage configuration, the chamber wall is folded at the thinner material allowing the metal facets to lay flat.

Figure 8:
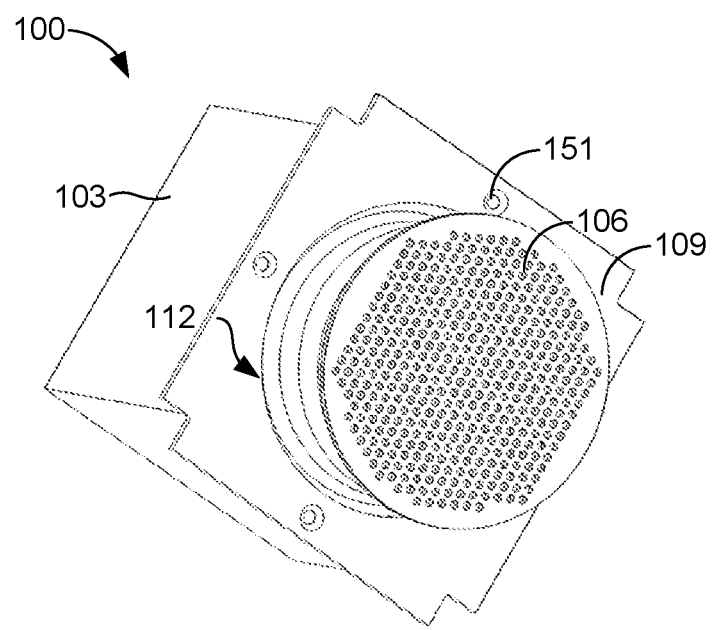
FIG. 8 is an isometric view at the chamber exit of the deployable gridded ion thruster of FIG. 1 in a deployed configuration, according to various embodiments of the present disclosure.
Figure 9:
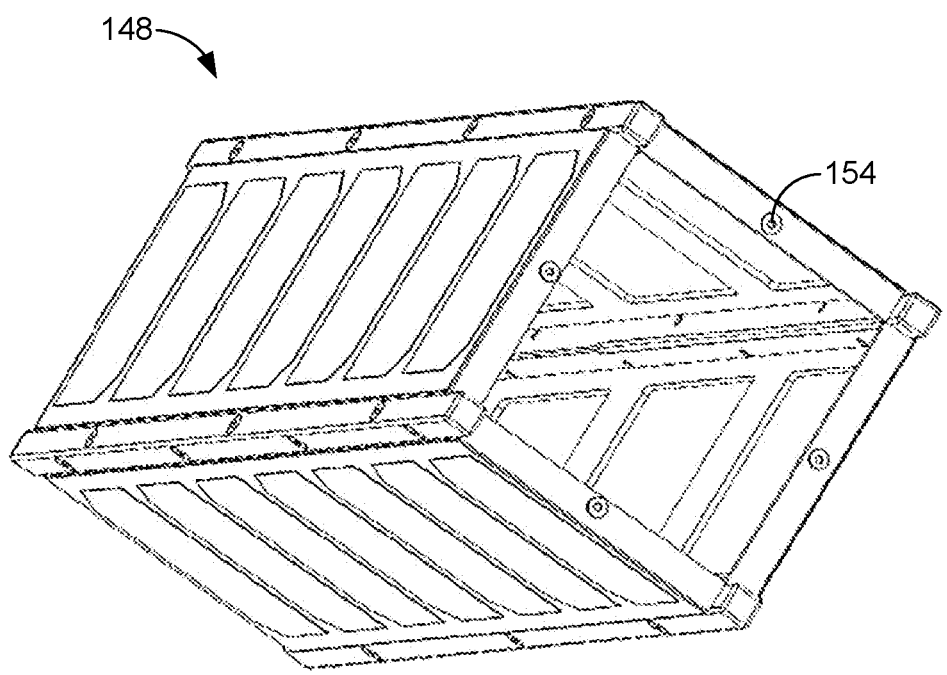
FIG. 9 is an isometric view of an exemplary satellite which can receive the deployable gridded ion thruster as a propulsion device according to various embodiments of the present disclosure.

Continuing with FIGS. 8 and 9, an example of the deployable gridded ion thruster 100 is shown positioned to be installed in a small satellite 148. The end plate 109 of the deployable gridded ion thruster 100 can be coupled to the small satellite 148 by fasteners or other appropriate coupling means. For example, a plurality of apertures 151 can be formed in the end of the deployable gridded ion thruster 100 to correspond with predefined apertures (e.g., threaded openings) 154 formed in an end of a satellite 148, so that when the deployable gridded ion thruster 100 is installed into the satellite 149 the end plate 109 can be secured by fasteners.

The deployable gridded ion thruster can comprise an ion generating unit or module that can include a discharge cathode located at a proximal end of the discharge chamber. Generated ions can be can be accelerated by magnetic fields established in the discharge chamber, and discharged through the ion grids for propulsion. The deployable gridded ion thruster can also comprise a thruster body and an expandable discharge chamber. The expandable discharge chamber can be configured to be stored in a first geometric shape, collapsed for storage and launch into orbit. The expandable discharge chamber can be deployed to a second geometric shape, where it is expanded for full operational capacity of the gridded ion thruster. The expandable discharge chamber can have a chamber wall that comprises printed circuits, that when energized, can generate magnetic fields for controlling the ion propulsion. The chamber wall of the expandable discharge chamber act as an anode. The thruster body can contain the fuel and subsystems needed to run the thruster. The deployable gridded ion thruster can further comprise at least one ion grid located at a distal end of the discharge chamber. The ion grids can be at least a negative grid and a positive grid. The deployable gridded ion thruster can further comprise a second neutralizer cathode to neutralize ions near the discharge of the deployable gridded ion thruster.

The method of deploying the deployable gridded ion thruster can comprise launching the deployable gridded ion thruster into orbit and deploying the expandable discharge chamber. The expandable discharge chamber can be deployed by expanding the chamber wall from the storage configuration to the operational configuration. The expandable discharge chamber to a spring loaded configuration in storage so that upon release of a latch, wire, or other securing device the chamber wall springs to its operational configuration.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A deployable gridded ion thruster, comprising:
a thruster body including an ion generating unit; and
an expandable discharge chamber configured to expand from a stored configuration to a deployed configuration, where the expandable discharge chamber comprises a chamber wall having a first geometric shape compressed within the thruster body when in the stored configuration and a second geometric shape expanded outward from the thruster body when in the deployed configuration.

2. The deployable gridded ion thruster of claim 1, wherein the expandable discharge chamber is further configured to retract from the second geometric shape to the first geometric shape.

3. The deployable gridded ion thruster of claim 2, wherein the expandable discharge chamber is deployed by burning a wire.

4. The deployable gridded ion thruster of claim 2, wherein the expandable discharge chamber is deployed by releasing a latch.

5. The deployable gridded ion thruster of claim 1, wherein the second geometric shape in the deployed configuration includes a polygonal cross-sectional shape of the expandable discharge chamber.

6. The deployable gridded ion thruster of claim 1, wherein the expandable discharge chamber can be compressed from the second geometric shape to the first geometric shape while in orbit.

7. The deployable gridded ion thruster of claim 1, wherein the chamber wall of the expandable discharge chamber is shaped as an origami tube, wherein the origami tube is folded to a flattened state in the first geometric shape and unfolds to the second geometric shape with deformations occurring only at fold lines.

8. The deployable gridded ion thruster of claim 1, wherein a magnetic field is generated by electrical circuits printed on a circumference of the expandable discharge chamber.

9. The deployable gridded ion thruster of claim 1, wherein the deployable gridded ion thruster is sized to fit within a cube with dimensions of 10 cm×10 cm×10 cm when the expandable discharge chamber is in the stored configuration.

10. A method of deploying a deployable gridded ion thruster, comprising:
    launching the deployable gridded ion thruster into orbit, wherein the deployable gridded ion thruster comprises an expandable discharge chamber having a chamber wall configured to expand from a first geometric shape compressed in a stored configuration in a thruster body to a second geometric shape expanded in a deployed configuration extending from the thruster body; and
    deploying the expandable discharge chamber.

11. The method of deploying the deployable gridded ion thruster of claim 10, wherein deploying the expandable discharge chamber comprises expanding the expandable discharge chamber from the first geometric shape to the second geometric shape.

12. The method of deploying the deployable gridded ion thruster of claim 10, further comprising releasing the expandable discharge chamber from the stored configuration by burning a wire.

13. The method of deploying the deployable gridded ion thruster of claim 10, further comprising releasing the expandable discharge chamber from the stored configuration by releasing a latch.

14. The method of deploying the deployable gridded ion thruster of claim 10, wherein the second geometric shape in the deployed configuration includes a polygonal cross-sectional shape of the expandable discharge chamber.

15. The method of deploying the deployable gridded ion thruster of claim 10, further comprising compressing the expandable discharge chamber from the second geometric shape to the first geometric shape while in orbit.

16. The method of deploying the deployable gridded ion thruster of claim 10, wherein the chamber wall of the expandable discharge chamber is shaped as an origami tube, wherein the origami tube is folded to a flattened state in the first geometric shape and unfolds to the second geometric shape with deformations occurring only at fold lines.

17. The method of deploying the deployable gridded ion thruster of claim 10, wherein a magnetic field is generated by electrical circuits printed on a circumference of the expandable discharge chamber.

18. The method of deploying the deployable gridded ion thruster of claim 10, wherein the deployable gridded ion thruster is sized to fit within a cube with dimensions of 10 cm×10 cm×10 cm when the expandable discharge chamber is in the stored configuration.

\* \* \* \* \*